United States Patent
Longin et al.

(10) Patent No.: US 10,802,501 B2
(45) Date of Patent: Oct. 13, 2020

(54) APPARATUS THAT AUTOMATICALLY MANEUVERS A WHEELCHAIR RELATIVE TO A VEHICLE

(71) Applicant: FORD GLOBAL TECHNOLOGIES, LLC, Dearborn, MI (US)

(72) Inventors: David Longin, Flanders (BE); Mark Gijbels, Vlaams-brabant (BE); Robin Celis, Flanders (BE); Gunther Cuypers, Lommel (BE)

(73) Assignee: Ford Global Technologies, LLC, Dearborn, MI (US)

( * ) Notice: Subject to any disclaimer, the term of this patent is extended or adjusted under 35 U.S.C. 154(b) by 434 days.

(21) Appl. No.: 15/794,292

(22) Filed: Oct. 26, 2017

(65) Prior Publication Data

US 2018/0120860 A1     May 3, 2018

(30) Foreign Application Priority Data

Oct. 28, 2016    (DE) .......................... 10 2016 221 365

(51) Int. Cl.
*G05D 1/02*       (2020.01)
*A61G 5/04*       (2013.01)
(Continued)

(52) U.S. Cl.
CPC ............. *G05D 1/0276* (2013.01); *A61G 3/02* (2013.01); *A61G 3/0209* (2013.01); *A61G 5/04* (2013.01);
(Continued)

(58) Field of Classification Search
CPC .. G05D 1/0276; G05D 1/0291; G05D 1/0278; G05D 2201/0206; A61G 5/04;
(Continued)

(56) References Cited

U.S. PATENT DOCUMENTS 6,889,171 B2    5/2005   Skrbina et al.
7,369,943 B2    5/2008   Adams
(Continued)

FOREIGN PATENT DOCUMENTS

CN         2807312 Y      8/2006
CN         202995348        6/2013
(Continued)

OTHER PUBLICATIONS

Translation of DE-102014221718-A1 obtained via ESPACENEt on Feb. 28, 2020. (Year: 2014).*
(Continued)

*Primary Examiner* — Jeffrey C Boomer
(74) *Attorney, Agent, or Firm* — Gregory P. Brown; Brooks Kushman P.C.

(57) ABSTRACT

The disclosure relates to a method and an apparatus to automatically maneuver a wheelchair relative to a vehicle. The vehicle has a first sensor arrangement comprising at least one sensor, and the wheelchair has a second sensor arrangement comprising at least one sensor. The automatic maneuver is carried out both on the basis of sensor signals from the first sensor arrangement and on the basis of sensor signals from the second sensor arrangement.

11 Claims, 1 Drawing Sheet

(51) Int. Cl.
*A61G 5/10* (2006.01)
*A61G 3/02* (2006.01)
*A61G 5/08* (2006.01)

(52) U.S. Cl.
CPC .............. *A61G 5/0866* (2016.11); *A61G 5/10* (2013.01); *A61G 5/1051* (2016.11); *G05D 1/0278* (2013.01); *G05D 1/0291* (2013.01); *A61G 2203/22* (2013.01); *G05D 2201/0206* (2013.01)

(58) Field of Classification Search
CPC .......... A61G 5/10; A61G 3/02; A61G 5/1051; A61G 2203/22; A61G 5/0866; A61G 3/0209; A61G 2203/70
See application file for complete search history.

(56) References Cited

U.S. PATENT DOCUMENTS

| | | | |
|---|---|---|---|
| 8,326,473 B2 | 12/2012 | Simpson et al. | |
| 9,741,255 B1 * | 8/2017 | Navot | ................. G08G 5/0082 |
| 2011/0316719 A1 | 12/2011 | Obuchi et al. | |
| 2015/0229906 A1 | 8/2015 | Inacio De Matos et al. | |

FOREIGN PATENT DOCUMENTS

| | | | | |
|---|---|---|---|---|
| CN | 204147195 U | | 2/2015 | |
| CN | 104958148 A | | 10/2015 | |
| CN | 205054634 U | | 3/2016 | |
| CN | 205322640 U | | 6/2016 | |
| DE | 102011103382 A1 | | 12/2012 | |
| DE | 102014221718 A1 | * | 4/2016 | ............ G08G 1/165 |
| JP | 2012103146 A | | 5/2012 | |
| KR | 101305336 B1 | | 9/2013 | |
| WO | 200805194 A2 | | 1/2008 | |

OTHER PUBLICATIONS

Schilling, Klaus, et al. "Sensors to improve the safety for wheelchair users." 3rd Annual TIDE Congress. 1998.
Hansen, J. D., et al. "Autonomous vehicle navigation utilizing fuzzy controls concepts for a next generation wheelchair." Biomedical sciences instrumentation 44 (2008): 69-75.

* cited by examiner

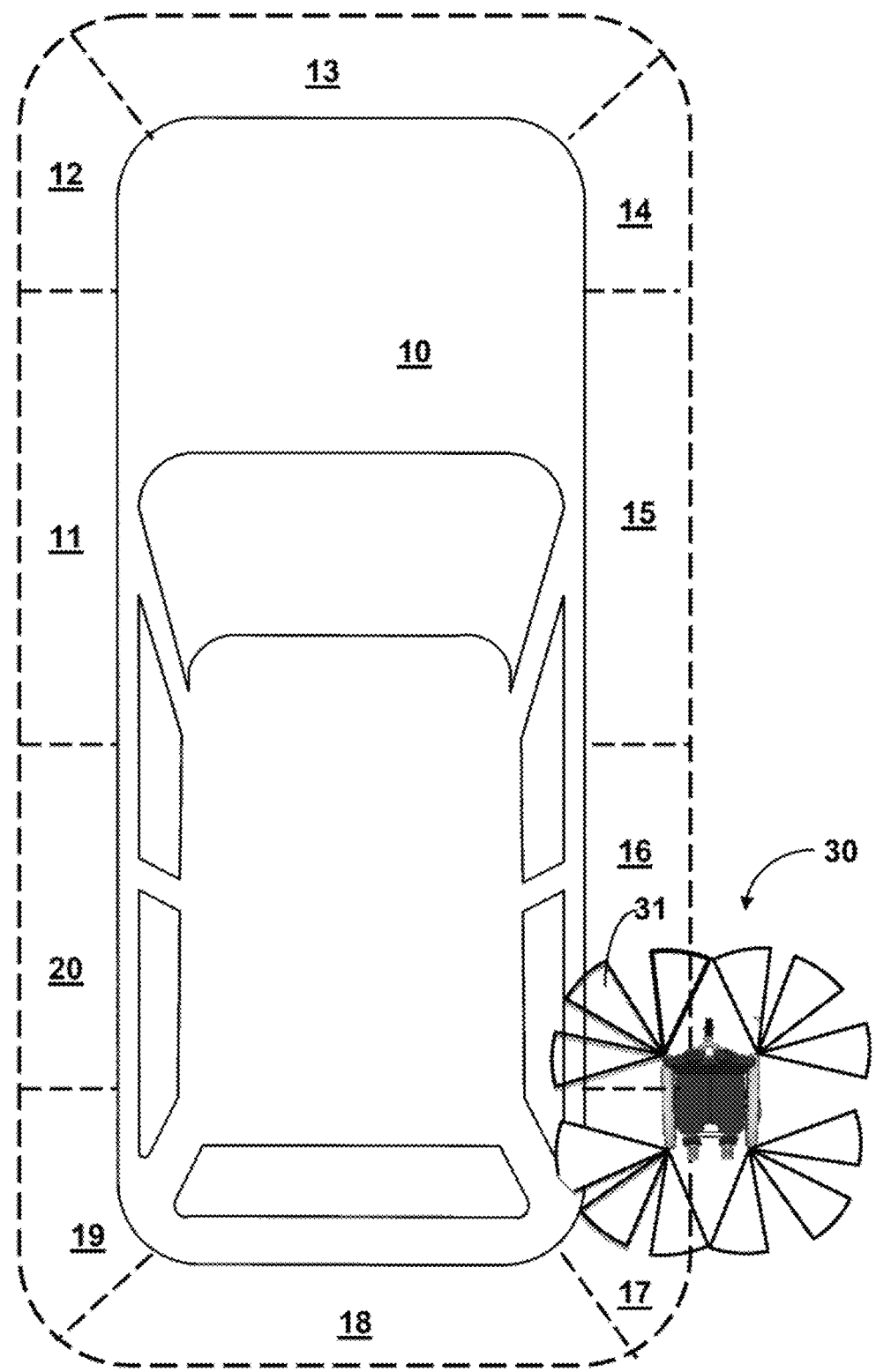

APPARATUS THAT AUTOMATICALLY MANEUVERS A WHEELCHAIR RELATIVE TO A VEHICLE

CROSS-REFERENCE TO RELATED APPLICATIONS

This application claims foreign priority benefits under 35 U.S.C. § 119(a)-(d) to DE Application 10 2016 221 365.2 filed Oct. 28, 2016, which is hereby incorporated by reference in its entirety.

TECHNICAL FIELD

The disclosure relates to a method and an apparatus to automatically maneuver a wheelchair relative to a vehicle.

BACKGROUND

Such maneuvering of a wheelchair relative to a vehicle can be carried out, in particular, after the wheelchair user has already himself taken a seat in the vehicle and the wheelchair is now intended to be loaded, or so that the driver or occupant of the vehicle can continue on his way with the aid of the wheelchair.

The automation of such a maneuvering and loading operation requires the wheelchair to automatically align, or orient, itself when moving around or navigating around the vehicle. On account of confined space conditions and short distances between the vehicle and the wheelchair, conventional navigation systems, for example GPS, cannot be used in this case on account of inadequate accuracy.

With respect to the prior art, reference is made, merely by way of example, to DE 10 2011 103 382 A1, JP 2012103146 A, KR 101305336 B1, CN 202995348 U; Hansen J D et al. "Autonomous vehicle navigation utilizing fuzzy controls concepts for a next generation wheelchair", Biomed Sci Instrum. 2008; 44:69-75, and the Internet publication Klaus Schilling et al.: "Sensors to Improve the Safety for Wheelchair Users", FH Ravensburg-Weingarten, Japanese Society for Rehabilitation of Persons with Disabilities (JSRPD).

SUMMARY

An object of the present disclosure is to provide a method and an apparatus that automatically maneuvers a wheelchair relative to a vehicle, which enable reliable and safe navigation with comparatively little outlay on the apparatus.

In a method according to the disclosure to automatically maneuver a wheelchair relative to a vehicle, the vehicle has a first sensor arrangement comprising at least one sensor, and the wheelchair has a second sensor arrangement comprising at least one sensor. The automatic maneuver is carried out both on the basis of sensor signals from the first sensor arrangement and on the basis of sensor signals from the second sensor arrangement.

The disclosure is now based on the concept, in particular, of jointly using existing sensors both of a vehicle and of a wheelchair, and combining, or linking, both sensor groups with one another in an integrated overall system. For this purpose, both the vehicle and the wheelchair are equipped with a communication module (for example based on Bluetooth or Wi-Fi) to interchange data with one another and/or to communicate with a central computing unit. The central computing unit is able to be an on-board computer provided in the vehicle, a CPU present on the wheelchair, an app or an additional apparatus, for example a smartphone.

In this case, the disclosure is based on the fact that modern vehicles are typically equipped with parking sensors (which operate electromagnetically or on the basis of ultrasound), blind spot detection systems and/or surround camera systems. According to the disclosure, such systems or vehicle sensors are now used to monitor the position and movement of the wheelchair in the region around the vehicle and to guide this for the purpose of navigation. If the vehicle is stationary, the changes perceived by the sensors are caused by a movable object in the environment of the vehicle, such as a wheelchair.

According to one embodiment, the method comprises interchanging sensor signals from the first sensor arrangement and from the second sensor arrangement between the vehicle and the wheelchair to coordinate the automatic maneuver of the wheelchair relative to the vehicle.

According to one embodiment, the method comprises transmitting sensor signals from the first sensor arrangement and from the second sensor arrangement to a computing unit, or a communication module. The transmission of sensor signals can be carried out, in particular, using wireless data transmission, in particular using Bluetooth or Wi-Fi.

According to one embodiment, the method respectively comprises orienting both the vehicle and the wheelchair in a compass-supported, or GPS-supported, manner to coordinate a respective shifting, or moving, direction between the vehicle and the wheelchair during the automatic maneuver.

According to one embodiment, the method comprises transmitting a movement request from the vehicle to the wheelchair in order to identify the wheelchair to be maneuvered before beginning the automatic maneuver.

According to one embodiment, the method is part of an automated loading operation, wherein the wheelchair is folded up during a loading operation after the automatic maneuver concludes.

According to one embodiment, the folding-up of the wheelchair comprises folding down a backrest of the wheelchair into a horizontal position in order to introduce the wheelchair on the folded-down backrest into a trunk or a loading compartment of the vehicle via a sliding movement. In this case, the trunk or loading compartment of the vehicle has a horizontally flat bottom, across which the wheelchair can be pushed on its folded-down backrest. The horizontally flat bottom of the trunk or loading compartment may be a displaceably mounted extendable loading compartment bottom.

The disclosure also relates to an apparatus to automatically maneuver a wheelchair relative to a vehicle, the apparatus being configured to carry out a method having the features described above. With respect to advantages and preferred configurations of the apparatus, reference is made to the statements above in connection with the method according to the disclosure.

Further configurations of the disclosure can be gathered from the description.

The disclosure will be explained in more detail below on the basis of an exemplary embodiment with reference to an accompanying FIGURE.

BRIEF DESCRIPTION OF THE DRAWINGS

The FIGURE shows a schematic illustration that illustrates a method according to the disclosure and an apparatus according to the disclosure in an exemplary embodiment.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

According to the FIGURE, a wheelchair 30 is situated in an immediate environment of a vehicle 10. In this case, an operation to maneuver this wheelchair 30 relative to the vehicle 10 is intended to be carried out, for example after the wheelchair user has already himself taken a seat in the vehicle 10 and the wheelchair 30 is now intended to be loaded, or so that the driver or occupant of the vehicle 10 can continue on his way with the aid of the wheelchair 30 and the wheelchair 30 is moved into a getting-in position suitable for this purpose.

The vehicle 10 has a plurality of (parking) sensors, which are symbolized in the FIGURE via capture ranges, or fields of view 11-20, of these sensors. A group of sensors (which operate electromagnetically or on the basis of ultrasound) that are comparable to parking sensors is likewise present on the wheelchair 30.

The maneuvering operation is now intended to be carried out such that an appropriate distance is maintained between the wheelchair 30 and the vehicle 10, and the vehicle 10 is prevented from being damaged, or the wheelchair 30 is prevented from getting stuck in a region of obstacles.

Furthermore, an apparatus is provided both on the wheelchair 30 and on the vehicle 10 according to the disclosure. The apparatus makes it possible to respectively orient the wheelchair 30 or the vehicle 10 with respect to North (using an electronic compass or a GPS apparatus) in order to coordinate a respective shifting, or moving, direction between the wheelchair 30 and the vehicle 10.

According to one embodiment, a method according to the disclosure can take place as follows:

A user of the wheelchair 30 starts the loading process. The vehicle 10 and the wheelchair 30 begin to communicate and interchange corresponding configuration settings (for example wheelchair dimensions). The vehicle 10 detects a location of the wheelchair 30 using its own (vehicle) sensors, for example parking sensors (electromagnetic parking sensors or parking sensors that operate on the basis of ultrasound), blind spot detection systems and/or surround camera systems.

The wheelchair dimensions are known from the interchange of configuration settings, thus facilitating identification. If the vehicle 10 is not able to identify the wheelchair 30 to be loaded, for instance on account of the presence of a plurality of possible wheelchairs, the wheelchair 30 to be maneuvered may be requested to move, with the result that the wheelchair 30 can be identified by the vehicle 10 as a movable object.

The wheelchair 30 uses the electromagnetic sensors or sensors that operate based on ultrasound and are comparable to parking sensors, which are fitted to it, to identify the directions in which a movement is allowed, and directions obstacles (including the vehicle 10) are present.

A central computing unit (CPU) combines the location of the wheelchair 30, as identified by the vehicle 10, with the possible movement paths identified by the wheelchair 30 using its own sensors. The orientation, both of the vehicle 10 and of the wheelchair 30, with respect to North can likewise be used to refine the respective movement path. The CPU calculates a movement path on the basis of this information and transmits the information relating to the movement path to the wheelchair 30.

In the next step, the wheelchair 30 starts to move and attempts to follow a calculated movement path. At the same time, the following steps are carried out in real time: the vehicle 10 uses its own vehicle sensors (for example electromagnetic sensors or sensors operating on the basis of ultrasound, blind spot detection systems and/or surround camera systems) to track movement of the wheelchair 30 around the vehicle 10. For example, an arrival of the wheelchair 30 can be captured by the sensors with the field of view 16 or 17 according to FIG. 1 (whereas other obstacles that do not belong to the wheelchair 30 can be captured by the sensors with the field of view 13 or 14, for example).

Furthermore, the wheelchair 30 uses its own electromagnetic sensors, or sensors that operate on the basis of ultrasound and are like parking sensors, to remain close to the vehicle 10, on the one hand, but also to comply with a safety distance, on the other hand. For example, according to the FIGURE, the vehicle 10 can be captured, inter alia, by the sensor with a field of view 31. In addition, the wheelchair 30 checks a presence of obstacles on a movement path. Furthermore, data are interchanged, on the basis of which the CPU refines and updates the movement path.

If the wheelchair 30 has arrived at one end of the vehicle 10, this is captured by a parking sensor, and a corresponding movement path that turns around the vehicle 10 can be calculated. If the wheelchair 30 has arrived at its destination (for example the trunk of the vehicle 10 to be loaded or in a region of a driver's door or passenger door in order to enable a driver or occupant of the vehicle 10 to get into the wheelchair 30), the apparatus that determines the orientation with respect to North makes it possible for the wheelchair 30 to properly orient itself with respect to the vehicle alignment or orientation in order to enable further steps, such as loading the wheelchair into the vehicle 10 or getting in or out of the wheelchair.

According to the disclosure, navigation of the wheelchair 30 in a region around the vehicle is enabled using the sensor arrangement available on the vehicle 10, and by combining vehicle and wheelchair sensors into a common sensor group. The wheelchair 30 must only be equipped with a comparatively small number of sensors and a limited computing capacity, and is nevertheless able to navigate around the vehicle 10 since data are interchanged between the vehicle 10 and the wheelchair 30 whilst ensuring a sufficient overview of the situation.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A vehicle and wheelchair system comprising:
   a vehicle having a trunk defining a compartment, a plurality of parking sensors including an ultra-sonic sensor, and a vehicle controller; and
   a wheelchair having an automatically folding backrest, a sensor arrangement including an ultra-sonic sensor, and a control module configured to communicate with the vehicle controller, the control module being programmed to move the wheelchair along a path using the sensor arrangement to avoid obstacles with the path into the compartment; wherein the vehicle controller is programmed to:
  receive wheelchair position data from the parking sensors,
  establish communication with the control module,
  in response to communication being establish, receive wheelchair dimensions,
  identifying the wheelchair based on the wheelchair dimensions,
  calculate a first wheelchair path based on identifying the wheelchair, data from the parking sensors including the wheelchair position data, and data from the sensor arrangement of the wheelchair,
  commanding the wheelchair to travel along the first wheelchair path,
  in response to at least one of the parking sensors detecting the wheelchair arriving at one end of the vehicle, calculate a second wheelchair path based on identifying the wheelchair, the data from the parking sensors, and the data from the sensor arrangement of the wheelchair,
  in response to at least one of the parking sensors detecting the wheelchair arriving at an end destination, (i) align the wheelchair with the trunk and (ii) command folding of the backrest, and
  command loading of the wheelchair into the compartment.

2. The system as claimed in claim 1 further comprising a navigation system that orients the wheelchair to coordinate the loading of the wheelchair.

3. The system as claimed in claim 1, wherein the command folding of the backrest includes command folding of the backrest to a horizontal position, and the command loading of the wheelchair into the trunk includes command the wheelchair to slide on the backrest into the compartment.

4. A method of automatically loading a wheelchair into a compartment of a vehicle that has a plurality of parking sensors including an ultra-sonic sensor, the method being performed by a controller of the vehicle comprising:
  receiving wheelchair position data from the parking sensors;
  establishing communication with the controller;
  in response to communication being establish, receiving wheelchair dimensions;
  identifying the wheelchair based on the wheelchair dimensions;
  calculating a first wheelchair path based on identifying the wheelchair, data from the parking sensor including the wheelchair position data, and data from a sensor arrangement of the wheelchair;
  commanding the wheelchair to travel along the first wheelchair path;
  in response to at least one of the parking sensors detecting the wheelchair arriving at one end of the vehicle, calculating a second wheelchair path based on identifying the wheelchair, the data from the parking sensors, and the data from the sensor arrangement of the wheelchair;
  in response to at least one of the parking sensors detecting the wheelchair arriving at an end destination, (i) align the wheelchair with the compartment and (ii) command folding of a backrest of the wheelchair; and
  commanding loading of the wheelchair into the compartment.

5. The method as claimed in claim 4 further comprising orienting the wheelchair using a vehicle navigation system to coordinate the loading of the wheelchair.

6. The method as claimed in claim 4, wherein the commanding folding of the backrest includes commanding folding of the backrest to a horizontal position, and the commanding loading of the wheelchair into the compartment includes commanding the wheelchair to slide on the backrest into the compartment.

7. A vehicle and wheelchair system comprising:
  a vehicle having a compartment, a plurality of parking sensors including an ultra-sonic sensor, and a vehicle controller; and
  a wheelchair having a sensor arrangement including an ultra-sonic sensor and a control module configured to communicate with the vehicle controller; wherein
  the vehicle controller is programmed to:
    receive wheelchair position data from the parking sensors,
    establish communication with the control module,
    in response to communication being establish, receive wheelchair dimensions,
  calculate a first wheelchair path based on identifying the wheelchair, data from the parking sensors including the wheelchair position data, and data from the sensor arrangement of the wheelchair,
  command the wheelchair to travel along the first wheelchair path,
  in response to at least one of the parking sensors detecting the wheelchair arriving at one end of the vehicle, calculate a second wheelchair path based on identifying the wheelchair, the data from the parking sensors, and the data from the sensor arrangement of the wheelchair
  in response to at least one of the parking sensors detecting the wheelchair arriving at an end destination, align the wheelchair with the compartment, and
  command loading of the wheelchair into the compartment.

8. The system as claimed in claim 7, wherein the wheelchair has an automatically folding backrest, and wherein the controller is further programmed to, command the backrest to a folded position.

9. The system as claimed in claim 8, wherein the controller commands the backrest to the folded position in response to the wheelchair arriving at the end destination.

10. The system as claimed in claim 8, wherein the command folding of the backrest includes command folding of the backrest to a horizontal position, and the command loading of the wheelchair into the compartment includes command the wheelchair to slide on the backrest into the compartment.

11. The system as claimed in claim 7 further comprising a navigation system that orients the wheelchair to coordinate the loading of the wheelchair.

* * * * *